US010220790B2

(12) United States Patent
Mozurkewich et al.

(10) Patent No.: US 10,220,790 B2
(45) Date of Patent: Mar. 5, 2019

(54) PIVOTING HANGER WITH POSITIVE RETENTION

(71) Applicant: Ford Global Technologies, LLC, Dearborn, MI (US)

(72) Inventors: Kevin Mozurkewich, Livonia, MI (US); Laura Bunn, Dearborn Heights, MI (US); Noelle Gooding, Newport Beach, CA (US); Alana Strager, Plymouth, MI (US); Kevin Wayne Preuss, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 39 days.

(21) Appl. No.: 15/416,767

(22) Filed: Jan. 26, 2017

(65) Prior Publication Data

US 2018/0208122 A1 Jul. 26, 2018

(51) Int. Cl.
*B60R 7/10* (2006.01)

(52) U.S. Cl.
CPC ..................... *B60R 7/10* (2013.01)

(58) Field of Classification Search
CPC ............ B60R 7/043; B60R 7/10; B60R 7/005
USPC .............................. 248/304, 308; 297/188.07
See application file for complete search history.

(56) References Cited

U.S. PATENT DOCUMENTS

| 253,737 | A | * | 2/1882 | McDonald | A47G 25/08 211/113 |
| 338,677 | A | | 3/1886 | Rubenstein | |
| 633,742 | A | * | 9/1899 | Turner | A47G 25/065 248/294.1 |
| 1,292,779 | A | * | 1/1919 | Home | A47G 25/065 248/292.13 |
| 2,390,257 | A | * | 12/1945 | Jahn | A47G 25/065 248/294.1 |
| 3,385,547 | A | * | 5/1968 | West | B60R 7/10 211/99 |
| 3,424,418 | A | | 1/1969 | Freedman et al. | |
| 4,221,354 | A | * | 9/1980 | Kempkers | A47G 25/065 224/927 |
| 4,720,028 | A | | 1/1988 | Takemura et al. | |
| 5,411,233 | A | * | 5/1995 | Grimes, III | B60R 7/10 224/313 |
| 5,492,260 | A | * | 2/1996 | Rieden | B60R 7/10 224/313 |
| 5,507,423 | A | | 4/1996 | Fischer et al. | |
| 5,791,614 | A | | 8/1998 | Sims | |

(Continued)

FOREIGN PATENT DOCUMENTS

DE 102011112438 A1 3/2013

*Primary Examiner* — Jose V Chen
(74) *Attorney, Agent, or Firm* — Vichit Chea; Price Heneveld LLP (57) ABSTRACT

A vehicle seating assembly includes a seat and a seatback. A retainer assembly is positioned in a rearward portion of the seatback. The retainer assembly includes a recess and a bezel positioned about a perimeter of the recess. A hanger is pivotably coupled to a lower portion of the recess. The hanger engages with an upper portion of the recess when in a stowed position. When in the stowed position the hanger defines an aperture between an inside surface of the hanger and a rear surface of the bezel. The aperture is of sufficient dimensions to prevent crushing an article that is supported by the hanger when the hanger is in the stowed position.

19 Claims, 8 Drawing Sheets

(56) References Cited

U.S. PATENT DOCUMENTS

| | | | | |
|---|---|---|---|---|
| 6,095,469 A * | 8/2000 | Von Alman | ............... | B60R 7/10 224/313 |
| 6,109,579 A * | 8/2000 | Huang | ................. | B60P 7/0807 248/294.1 |
| 6,457,690 B1 * | 10/2002 | Spykerman | ............... | B60R 7/10 224/313 |
| 6,698,695 B1 * | 3/2004 | Spoto | ....................... | B60R 7/02 24/567 |
| 6,799,710 B1 * | 10/2004 | Carr | ....................... | B23K 3/02 219/242 |
| 6,935,601 B2 * | 8/2005 | Tanaka | ..................... | B60R 7/02 224/282 |
| 6,959,954 B2 * | 11/2005 | Brandt | ..................... | B60R 7/10 224/313 |
| 6,968,601 B2 * | 11/2005 | Bivens | ..................... | B60R 7/10 224/313 |
| 7,213,877 B2 * | 5/2007 | Gramss | .................. | B60R 7/043 297/188.03 |
| 7,669,821 B2 | 3/2010 | Martin | | |
| 8,079,446 B2 * | 12/2011 | Nemoto | ..................... | B60R 7/10 185/40 H |
| 8,490,935 B2 * | 7/2013 | Myers | ....................... | B60R 7/10 248/289.11 |
| 8,550,417 B2 * | 10/2013 | Lee | ........................... | B60R 7/10 248/304 |
| 8,820,597 B2 * | 9/2014 | Huelke | ..................... | B60R 7/10 224/311 |
| 9,725,032 B2 * | 8/2017 | Huelke | ..................... | B60Q 3/85 |
| 2005/0076471 A1 * | 4/2005 | Watanabe | ................ | B60R 7/06 16/66 |
| 2008/0011753 A1 * | 1/2008 | Browne | .................. | B60R 7/043 220/260 |
| 2009/0250579 A1 * | 10/2009 | Nishida | ..................... | B60R 7/08 248/308 |
| 2017/0313257 A1 * | 11/2017 | Kang | ....................... | B60R 7/04 |

\* cited by examiner

PIVOTING HANGER WITH POSITIVE RETENTION

FIELD OF THE DISCLOSURE

The present disclosure generally relates to a hanger. More specifically, the present disclosure relates to a hanger with positive retention.

BACKGROUND OF THE INVENTION

Storage in a vehicle is a feature often considered by consumers when deciding between vehicles to purchase. Available storage solutions typically include glove boxes, center consoles, cup holders, pockets, recesses, cubbies, and general cargo areas. However, occupants that carry handbags or purses generally are not provided with a dedicated storage area in the vehicle for their handbags or purses. Therefore, a need exists for a vehicle storage solution for the handbag or purse of an occupant that is functional, aesthetically pleasing, and does not create safety hazards.

SUMMARY OF THE INVENTION

According to one aspect of the present disclosure, a vehicle seating assembly includes a seat and a seatback. A retainer assembly is positioned in a rearward portion of the seatback. The retainer assembly further includes a recess and a bezel. The bezel is positioned about a perimeter of the recess. A hanger is pivotably coupled to a lower portion of the recess. The hanger engages with an upper portion of the recess when in a stowed position. When in the stowed position the hanger defines an aperture between an inside surface of the hanger and a rear surface of the bezel. The aperture is of sufficient dimensions to prevent crushing an article that is supported by the hanger when the hanger is in the stowed position.

According to another aspect of the present disclosure, a vehicle seating assembly includes a seat and a seatback. A retainer assembly is positioned in a rearward portion of the seatback. The retainer assembly includes a hanger pivotably coupled to the retainer assembly. The hanger engages with the retainer assembly in a stowed position such that an aperture is maintained between an inside surface of the hanger and a rear surface of the seatback.

According to yet another aspect of the present disclosure, a vehicle seating assembly includes a seat and a seatback. A retainer assembly is positioned in a rearward portion of the seatback. The retainer assembly includes a hanger that engages with the retainer assembly in a stowed position such that an aperture is maintained between an inside surface of the hanger and a rear surface of the seatback.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
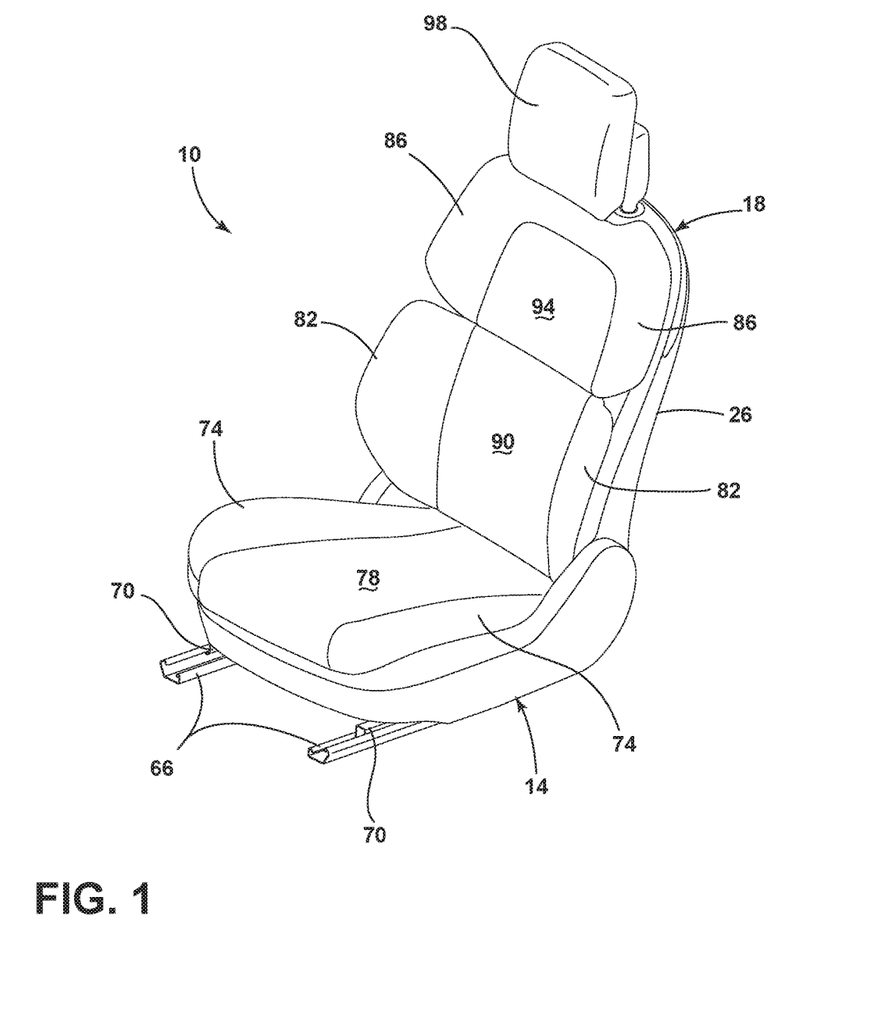
FIG. 1 is a front perspective view of a vehicle seating assembly equipped with a pivoting hanger retainer assembly.
Figure 2:
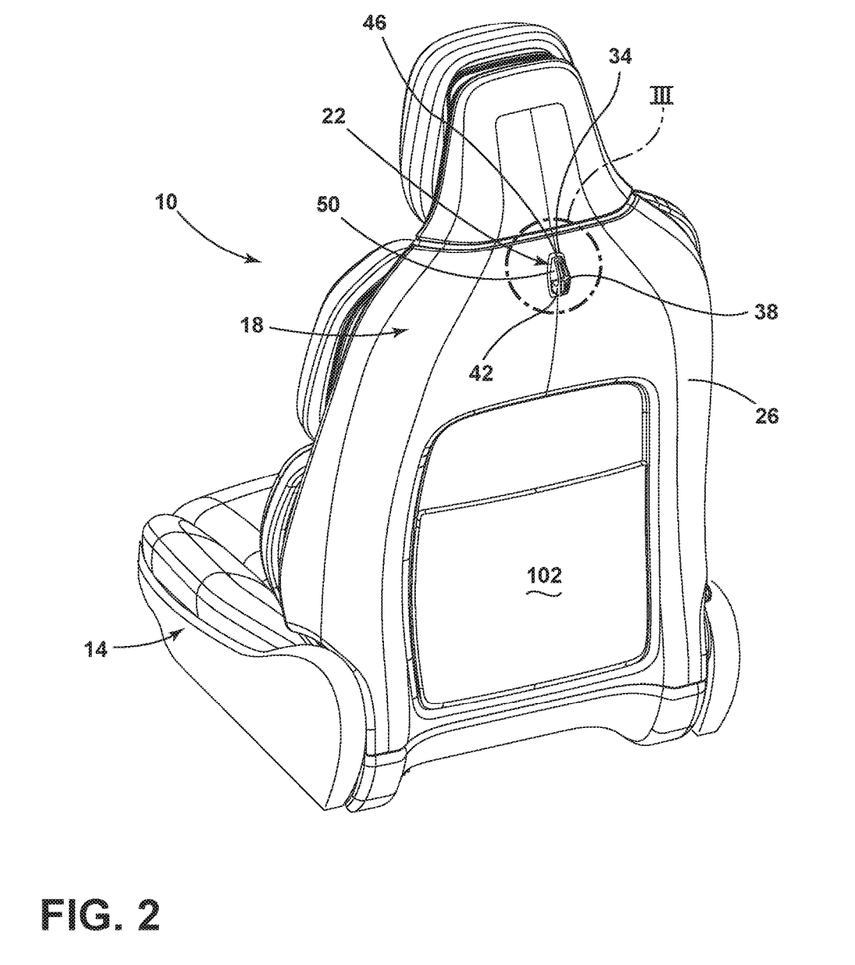
FIG. 2 is a rear perspective view of the vehicle seating assembly showing the retainer assembly.

For purposes of description herein, the terms "upper," "lower," "right," "left," "rear," "front," "vertical," "horizontal," and derivatives thereof shall relate to the concepts as oriented in FIG. 2. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a retainer assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-8, a vehicle seating assembly 10 is illustrated having a seat 14 and a seatback 18. A retainer assembly 22 is positioned in a rearward portion 26 of the seatback 18. The retainer assembly 22 includes a recess 30, a bezel 34, and a hanger 38. The bezel 34 is positioned about a perimeter of the recess 30. The hanger 38 is pivotably coupled to a lower portion 42 of the recess 30 such that the hanger 38 pivots outward and inward about a horizontal axis on the lower portion 42. The hanger 38 engages with an upper portion 46 of the recess 30 when the hanger 38 is in a stowed position. When the hanger 38 is in the stowed position an aperture 50 is maintained between an inside surface 54 of the hanger 38 and a rear surface 58 of the bezel 34. The aperture 50 is of sufficient dimensions to prevent crushing an article 62 supported by the hanger 38 when the hanger 38 is in the stowed position.

Referring again to FIG. 1, the seatback 18 is pivotably coupled to the seat 14 according to one embodiment. The vehicle seating assembly 10 includes mounting rails 66. The mounting rails 66 can be operably coupled with a support structure, such as the floor of a motor vehicle, and slidably engage with positioning rails 70 that allow an occupant to adjust the position of the vehicle seating assembly 10 relative to the vehicle cabin. The positioning rails 70 are operably coupled to an underside of the seat 14. The seat 14 can include side bolsters 74 that flank either side of a central seat portion 78. The seatback 18 can include lumbar side bolsters 82, shoulder side bolsters 86, a central lumbar portion 90, and a central shoulder portion 94. The seatback 18 further includes the rearward portion 26 and a headrest 98 can be extendably coupled to a top side of the seatback 18.

Referring now to FIG. 2, the rearward portion 26 of the seatback 18 can be equipped with various functionalities such as a pocket 102 and the retainer assembly 22. The shape and appearance of the retainer assembly 22 can be configured and/or customized to provide various branding options. For example, the retainer assembly 22 can be used to present a rear seat passenger with the emblem or logo that is associated with the vehicle manufacture that is providing the vehicle seating assembly 10, the emblem or logo associated with the trim package chosen by the purchaser of the vehicle, and/or a customized emblem or logo chosen by the consumer.

Figure 3:
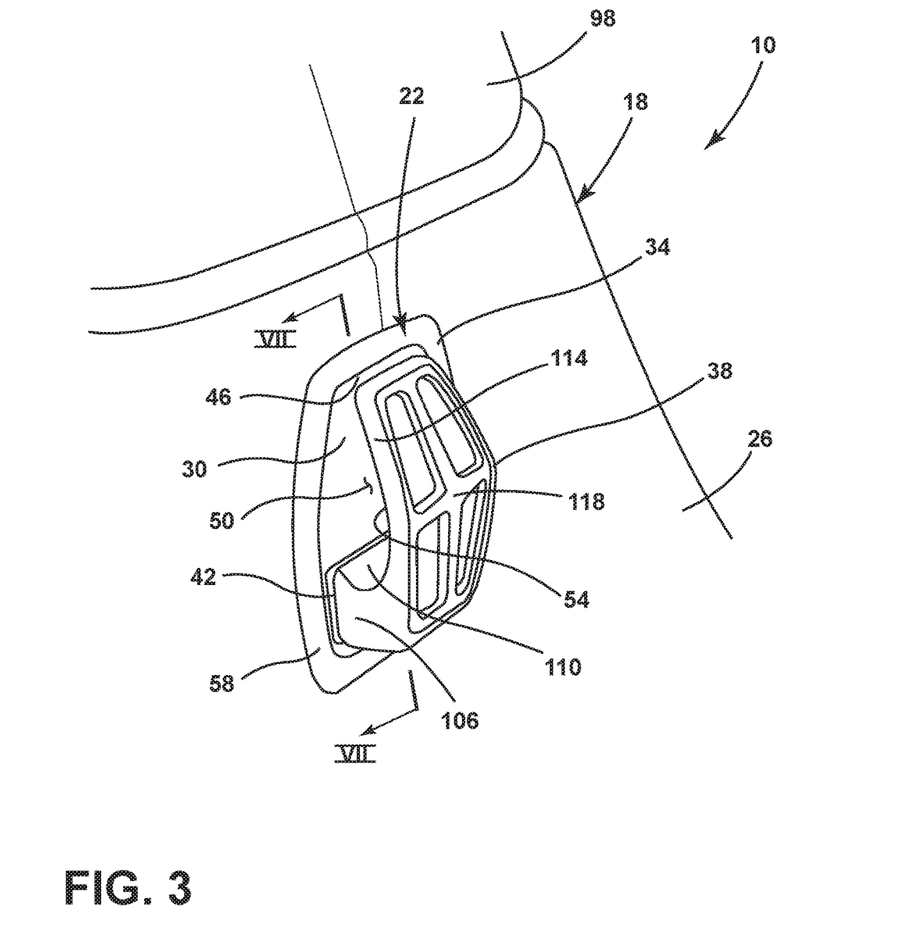
FIG. 3 is an expanded view taken at section III of FIG. 2 of a rearward portion of the seatback, showing the retainer assembly in a stowed position.
Figure 4:
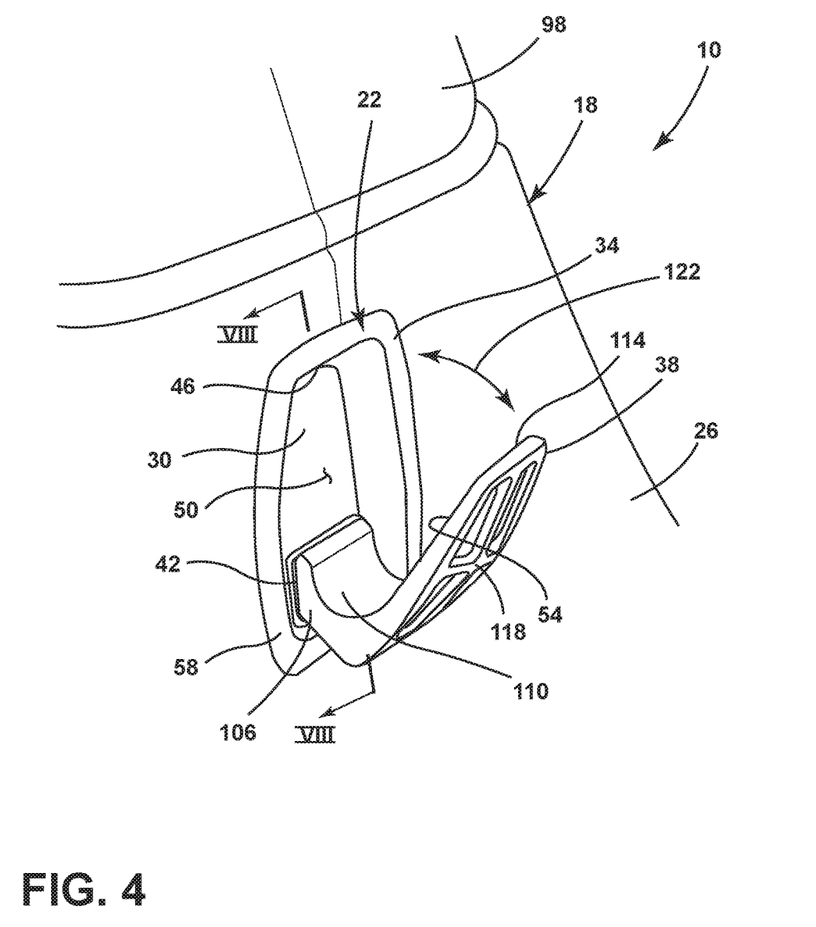
FIG. 4 is an expanded view taken at section III of FIG. 2 of the rearward portion of the seatback, showing the retainer assembly in a use position.

Referring to FIGS. 3 and 4, the retainer assembly 22 is movable between the inward stowed position (FIG. 3) and an outward use position (FIG. 4). The hanger 38 can have a generally arcuate shape to provide the aperture 50 between the inside surface 54 of the hanger 38 and the rear surface 58 of the bezel 34. The hanger 38 is pivotably coupled to the lower portion 42 of the recess 30. The hanger 38 can be alternatively configured without departing from the concepts disclosed herein. For example, the hanger 38 can be linearly actuated between the stowed position and the use position such that a user of the hanger 38 can extend the hanger 38 from the stowed position to the use position. In such an embodiment, the hanger 38 can be generally hook shaped including J-shaped or U-shaped such that while in the stowed position the hanger 38 prevents crushing the article 62 (FIG. 6) that is supported by the hanger 38. In embodiments that utilize the J-shaped or U-shaped hanger 38 the article 62 is protected from crushing by maintaining the aperture 50 while the hanger 38 is in the stowed position. The aperture 50 can be provided by the region of the J-shaped or U-shaped hanger 38 that is proximal the closed end or parabolic end of the J-shaped or U-shaped hanger 38.

Referring again to FIGS. 3 and 4, the hanger 38 includes a mounting portion 106, a concave bearing surface 110, and an inwardly curving portion 114. The inwardly curving portion 114 converges with the upper portion 46 of the recess 30 when the hanger 38 is in the stowed position. The hanger 38 further includes an outward surface 118 that can bear supplier-customizable branding. The supplier-customizable branding can be a logo, an emblem, a symbol that represents a trim package of a vehicle, or a consumer-selected alternative. The retainer assembly 22 can be vertically positioned in the rearward portion 26 of the seatback 18 proximal the headrest 98. By vertically positioning the retainer assembly 22 in the rearward portion 26 of the seatback 18 proximal the headrest 98, the article 62 (FIG. 5) supported by the hanger 38 is suspended above the floor board of the vehicle. Said another way, the vertical positioning of the hanger 38 prevents the article 62 from resting on the floor board of the vehicle.

Figure 5:
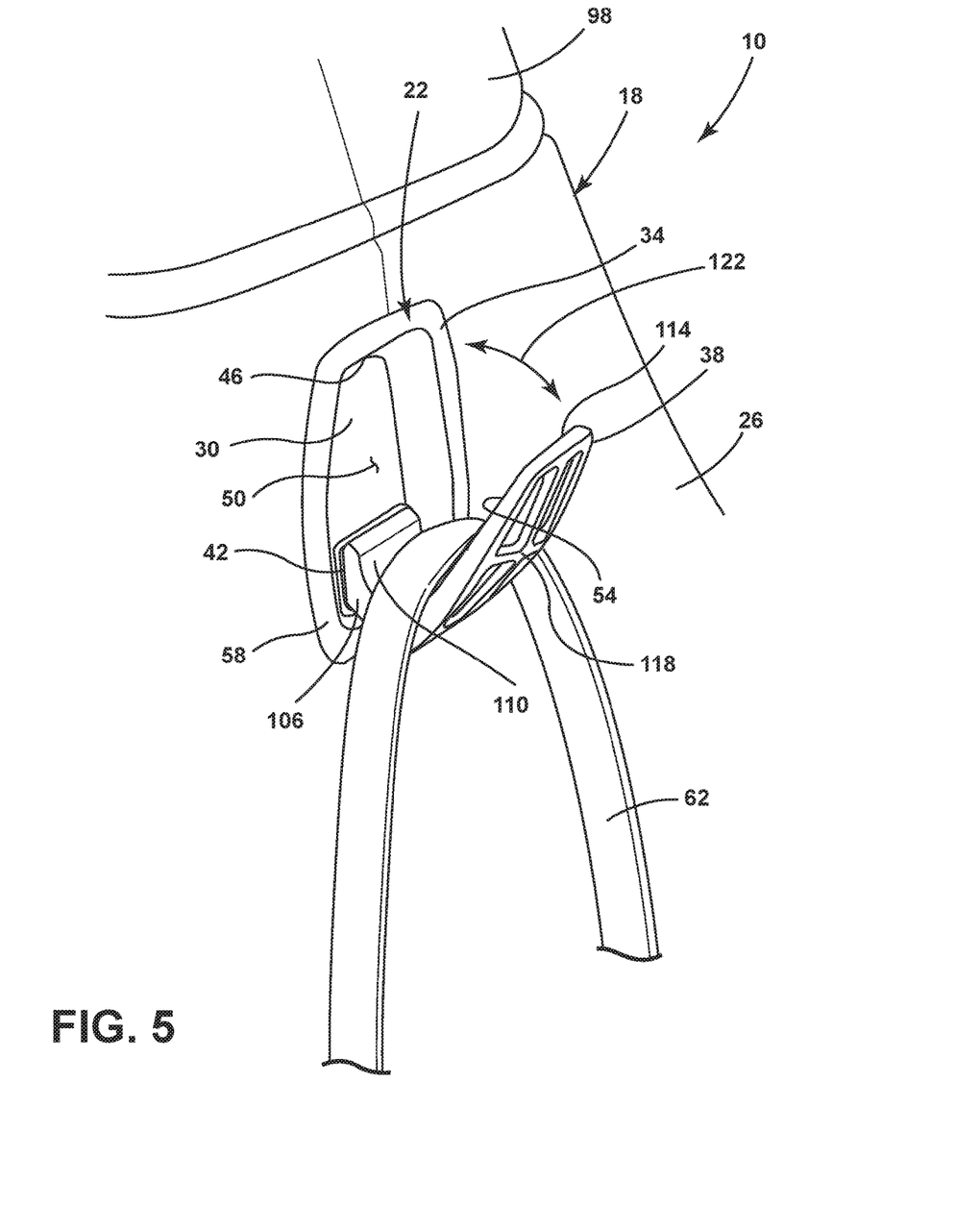
FIG. 5 is an expanded view taken at section III of FIG. 2 of the rearward portion of the seatback, showing the retainer assembly in the use position and supporting an article.
Figure 6:
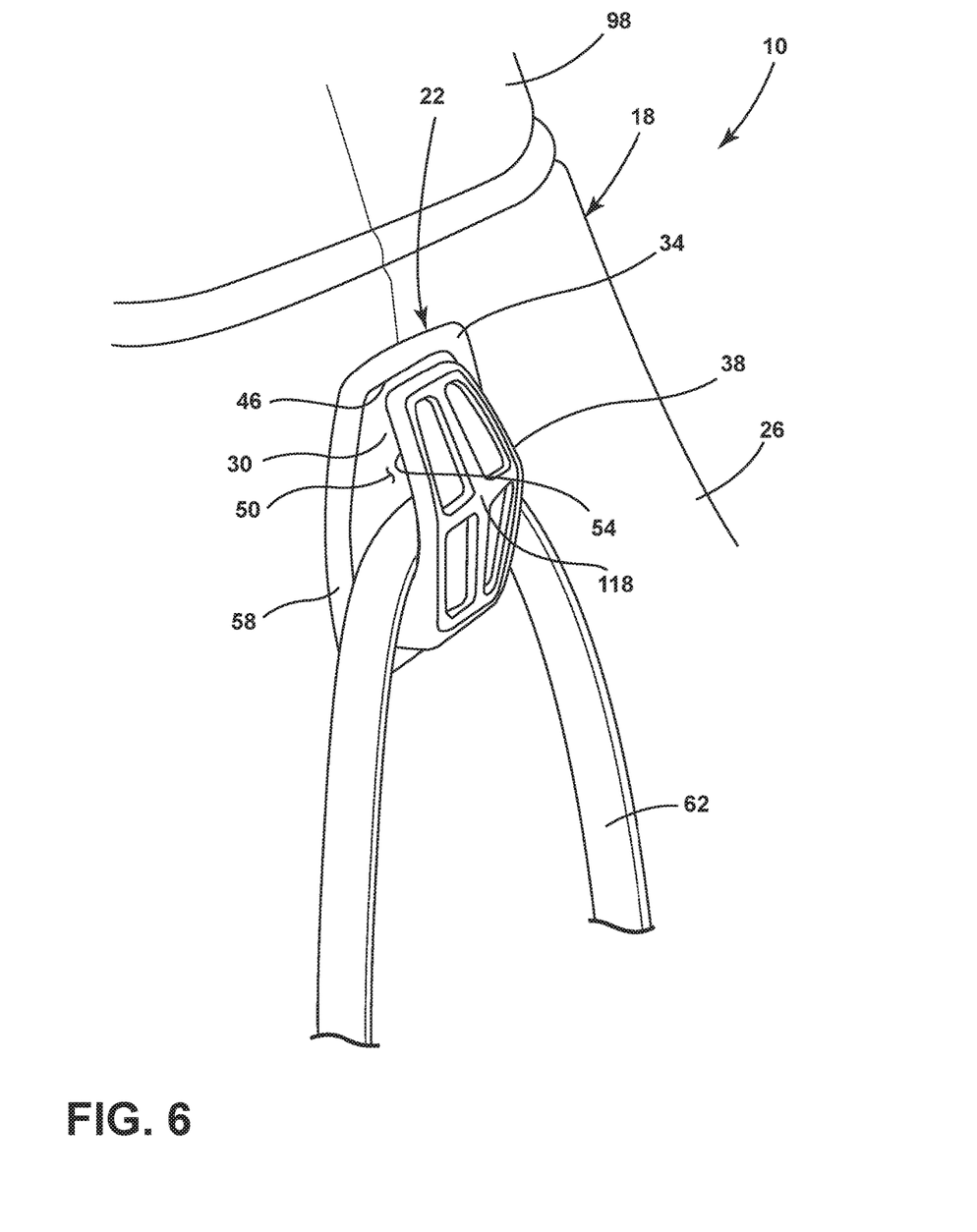
FIG. 6 is an expanded view taken at section III of FIG. 2 of the rearward portion of the seatback, showing the retainer assembly in the stowed position and supporting the article.

Referring now to FIGS. 5 and 6, the article 62 supported by the hanger 38 can be a purse, a grocery bag, a hand bag, a clothes hanger, or the like according to various examples. Such articles 62 may have a strap or other hanging support device. A user of the hanger 38 can transition the hanger 38 from the stowed position to the use position by applying an opening force in a lateral direction 122 relative to the seatback 18. The opening force applied to transition the hanger 38 from the stowed position to the use position is greater than an article-induced force such that the hanger 38 can remain in the stowed position while supporting the article 62. Said another way, the article 62 may provide the article-induced force to the hanger 38, however, the article-induced force is typically less than the opening force applied to transition the hanger 38 from the stowed position to the use position. Therefore, the retainer assembly 22 can automatically retain the article 62 after the article 62 has been stored on the hanger 38. Additionally, by having the opening force be greater than the article-induced force, the hanger 38 is prevented from inadvertent deployment from the stowed position to the use position by the article 62 while the vehicle is in motion during normal driving conditions. An added benefit to the opening force being greater than the article-induced force is that wear and tear on the retainer assembly 22 can be reduced since the hanger 38 can remain at rest in the stowed position rather than being continuously held in the use position.

Figure 7:
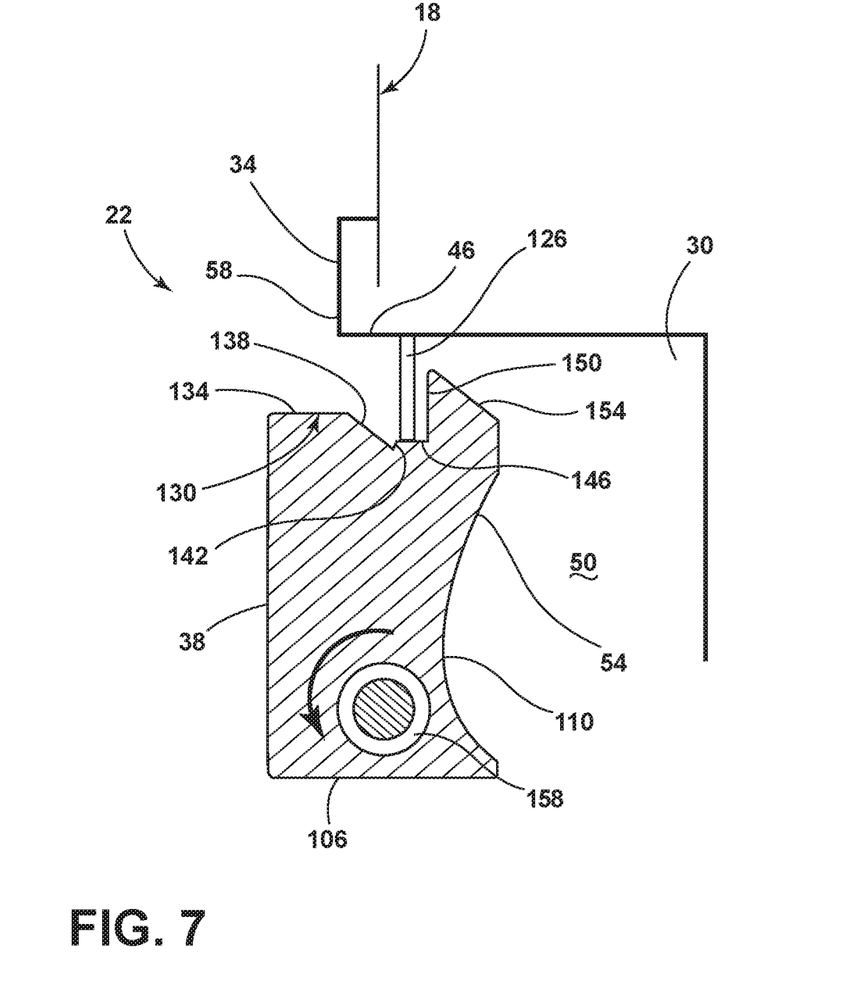
FIG. 7 is a cross-sectional view, taken along line VII-VII of FIG. 3, according to one embodiment of the retainer assembly.
Figure 8:
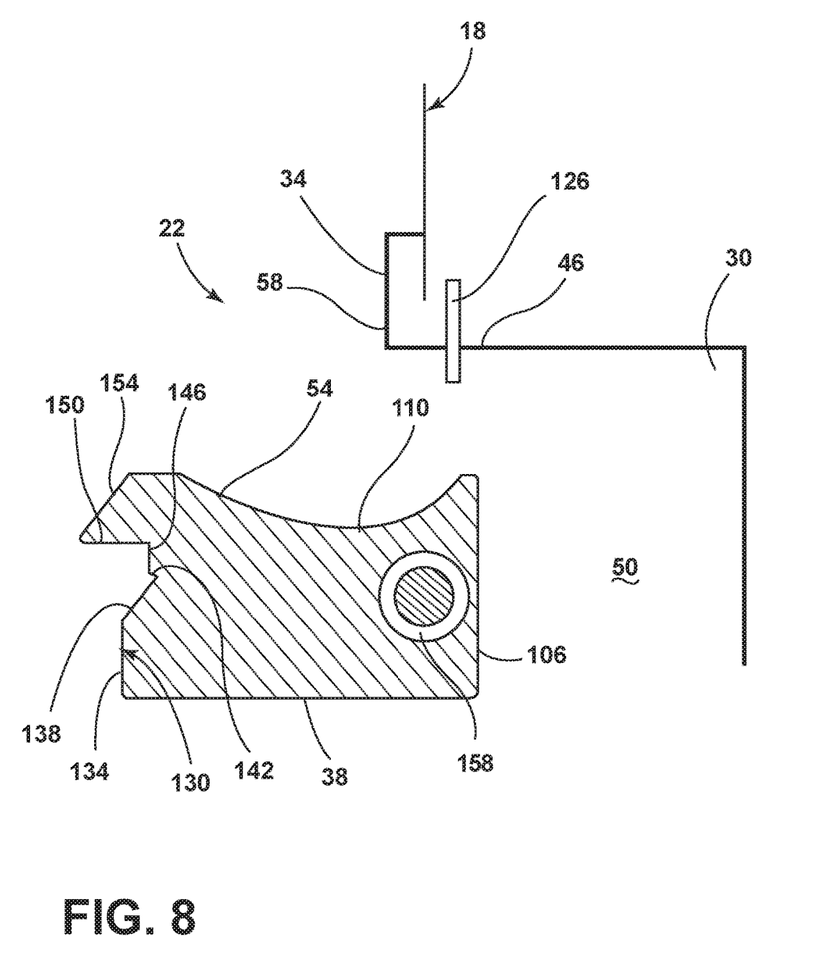
FIG. 8 is a cross-sectional view, taken along line VIII-VIII of FIG. 4, according to one embodiment of the retainer assembly.

Referring to FIGS. 7 and 8, the retainer assembly 22 is further shown operably coupled to the seatback 18. The bezel 34 is positioned about the perimeter of the recess 30. A locking pin 126 engages with a top portion 130 of the hanger 38. The locking pin 126 is operably coupled to the retainer assembly 22 within the recess 30. The locking pin 126 is actuated via the interaction between the locking pin 126 and the top portion 130 of the hanger 38 when the hanger 38 is actuated inwardly by a user. The locking pin 126 includes a locking mechanism that provides the locking pin in either a deployed (FIG. 7) or retracted (FIG. 8) position. Sequential actuations of the locking pin 126 alternate between the deployed and the retracted positions. The alternation between the deployed position and the retracted position can be accomplished by any suitable multi-position mechanism. For example, the alternation between the deployed position and the retracted position can be accomplished by a push-push mechanism. Alternatively, the alternation between the deployed position and the retracted position can be accomplished by a click-click mechanism that rotates about a central axis of the locking pin 126 with successive actuations to provide the deployed and retracted positions. A suitable click-click mechanism can operate in a similar fashion to the click-click mechanism provided in retractable ink pens.

Referring again to FIGS. 7 and 8, the top portion 130 of the hanger 38 can include a first horizontal portion 134, a first sloping portion 138, a notch 142, a second horizontal portion 146, a vertical portion 150, and a second sloping portion 154. When the hanger 38 is actuated while in the stowed position, the hanger 38 moves inward toward the recess 30. The first sloping portion 138 then contacts the locking pin 126 and begins to actuate the locking pin 126 from the deployed position to the retracted position. As rotation of the hanger 38 progresses, the first horizontal portion 134 can further actuate the locking pin 126 to the retracted position. Once the locking pin 126 reaches the retracted position and the user ceases actuating the hanger 38, then the locking pin 126 has been actuated a sufficient distance to permit passage of the vertical portion 150 and deployment of the hanger 38 to the use position. When the hanger 38 is then actuated from the use position toward the stowed position, contact between the locking pin 126 and the hanger 38 is first made by the second sloping portion 154. The second sloping portion 154 actuates the locking pin 126. As the second sloping portion 154 passes the locking pin 126, the locking pin 126 extends from the retracted position to the deployed position. As the locking pin 126 is moving to the deployed position the locking pin 126 passes by the vertical portion 150 and comes into contact with, or comes into close proximity to, the second horizontal portion 146.

Referring further to FIGS. 7 and 8, the hanger 38 is shown biased toward the use position by a resilient member 158, such as a spring, clock spring, torsion spring, or the like. The resilient member 158 can be positioned in the mounting portion 106 of the hanger 38. The resilient member 158 can be further located at or near the axis of rotation of the hanger 38. The locking pin 126 prevents rotation of the hanger 38 to the use position when the locking pin 126 is in the deployed position. The locking pin 126 prevents rotation of the hanger 38 to the use position by providing a physical barrier to the rotation of the hanger 38. The physical barrier to the rotation of the hanger 38 can be provided by physical contact between the locking pin 126 and either or both the second horizontal portion 146 and the vertical portion 150. The hanger 38 includes the mounting portion 106 and the concave bearing surface 110.

The retainer assembly 22 described herein provides consumers with a functional and aesthetically pleasing storage solution that does not create safety hazards. One example of the type of article 62 that can be supported on the retainer assembly 22 is a handbag. More specifically, the retainer assembly 22 can receive the strap or handle of a handbag. For example, the retainer assembly 22 can receive at least one 20 mm handbag strap according to one specific example. Additionally, the retainer assembly 22 is positioned on the rearward portion 26 of the seatback 18 such that the article 62 hangs and remains suspended above the floor board of the vehicle. Further, the hanger 38 can support a load that is static or dynamic of at least about 4.5 kilograms (10 pounds). While shown as a single retainer assembly 22 in the rearward portion 26 of the seatback 18, it is contemplated that more than one retainer assembly 22 and more than one hanger 38 per retainer assembly 22 can be utilized without departing from the concepts disclosed herein.

The retainer assembly 22 is provided with the added benefit of being easily deployable. The deployable nature of the retainer assembly 22 permits stowage of the hanger 38 when not in use, thereby decreasing or eliminating snagging hazards for rearward seated passengers. The actuation or deployment of the hanger 38 can be tuned to meet various requirements, specifications, and/or user-experience metrics. The inwardly curving portion 114 of the hanger 38 provides customizable branding options. The branding option chosen can impact the size and/or dimensions of the retainer assembly 22 and/or the hanger 38. While the size and/or dimensions of the retainer assembly 22 and/or the hanger 38 can vary, the operation of the retainer assembly 22 and/or the hanger 38 can remain constant. The retainer assembly 22 described herein has the further and significant benefit of being able to support the article 62 while in either the use position or the stowed position without crushing the handle or strap of the article 62. The handle or strap of the article 62 is prevented from crushing by the aperture 50 that is provided and maintained between the inside surface 54 of the hanger 38 and the rear surface 58 of the bezel 34.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle seating assembly comprising:
   a seat;
   a seatback;
   a retainer assembly positioned in a rearward portion of the seatback, wherein the retainer assembly comprises:
      a recess;
      a bezel positioned about a perimeter of the recess; and
      an arcuate hanger pivotably coupled to a lower portion of the recess, wherein the arcuate hanger engages with an upper portion of the recess when in a stowed position such that an aperture is maintained between an inside surface of the arcuate hanger and a rear surface of the bezel, and wherein the aperture is of sufficient dimensions to prevent crushing an article supported by the arcuate hanger when the arcuate hanger is in the stowed position.

2. The vehicle seating assembly of claim 1, wherein the arcuate hanger includes a mounting portion, a concave bearing surface, and an inwardly curving portion that converges with the upper portion of the recess when the arcuate hanger is in the stowed position.

3. The vehicle seating assembly of claim 1, wherein the retainer assembly is vertically positioned in the rearward portion of the seatback proximal a headrest of the seatback.

4. The vehicle seating assembly of claim 1, wherein the arcuate hanger includes an outward surface that bears supplier-customizable branding.

5. The vehicle seating assembly of claim 1, wherein the article supported by the arcuate hanger is a handbag.

6. The vehicle seating assembly of claim 1, wherein the article supported by the arcuate hanger is a purse.

7. The vehicle seating assembly of claim 1, wherein the article supported by the arcuate hanger is a grocery bag.

8. A vehicle seating assembly comprising:
   a seat;
   a seatback; and
   a retainer assembly positioned in a rearward portion of the seatback, wherein the retainer assembly includes an arcuate hanger pivotably coupled to the retainer assembly, and wherein the arcuate hanger engages with the retainer assembly in a stowed position such that an aperture is maintained between, and defined by, an inside surface of the arcuate hanger and a rear surface of the seatback.

9. The vehicle seating assembly of claim 8, wherein the retainer assembly further comprises:
   a recess; and
   a bezel positioned about a perimeter of the recess.

10. The vehicle seating assembly of claim 9, wherein the arcuate hanger is pivotably coupled to a lower portion of the recess.

11. The vehicle seating assembly of claim 9, wherein the aperture is of sufficient dimensions to prevent crushing an article supported by the arcuate hanger when the arcuate hanger is in the stowed position.

12. The vehicle seating assembly of claim 11, wherein the article supported by the arcuate hanger is a purse.

13. The vehicle seating assembly of claim 9, wherein the arcuate hanger includes a mounting portion, a concave bearing surface, and an inwardly curving portion that converges with an upper portion of the recess when the arcuate hanger is in the stowed position.

14. The vehicle seating assembly of claim 8, wherein the arcuate hanger includes an outward surface that bears supplier-customizable branding.

15. A vehicle seating assembly comprising:
   a seat;
   a seatback; and
   a retainer assembly positioned in a rearward portion of the seatback and having a bezel positioned about a perimeter of a recess, the retainer assembly including a hanger that engages with the retainer assembly in a stowed position such that an aperture is maintained between an inside surface of the hanger and a rear surface of the seatback.

16. The vehicle seating assembly of claim 15, wherein the hanger is pivotably coupled to a lower portion of the recess.

17. The vehicle seating assembly of claim 15, wherein the hanger includes a mounting portion, a concave bearing surface, and an inwardly curving portion that converges with an upper portion of the recess when the hanger is in the stowed position.

18. The vehicle seating assembly of claim 15, wherein the aperture is of sufficient dimensions to prevent crushing an article supported by the hanger when the hanger is in the stowed position.

19. The vehicle seating assembly of claim 18, wherein an opening force applied in a lateral direction for transitioning the hanger from the stowed position to a use position is greater than an article-induced force such that the hanger can remain in the stowed position while supporting the article.

* * * * *